(12) United States Patent
Wang et al.

(10) Patent No.: US 9,359,454 B2
(45) Date of Patent: *Jun. 7, 2016

(54) METHOD FOR MAKING SOLID ELECTROLYTE

(71) Applicants: Tsinghua University, Beijing (CN); HON HAI PRECISION INDUSTRY CO., LTD., Tu-Cheng, New Taipei (TW)

(72) Inventors: Li Wang, Beijing (CN); Xiang-Ming He, Beijing (CN); Jian-Jun Li, Beijing (CN); Jian Gao, Beijing (CN); Chang-Yin Jiang, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 653 days.

This patent is subject to a terminal disclaimer.

(21) Appl. No.: 13/652,824

(22) Filed: Oct. 16, 2012

(65) Prior Publication Data
US 2013/0157145 A1 Jun. 20, 2013

(30) Foreign Application Priority Data
Dec. 17, 2011 (CN) .......................... 2011 1 0423696

(51) Int. Cl.
*H01M 10/0565* (2010.01)
*C08F 2/48* (2006.01)
*C08F 222/10* (2006.01)
*C08F 299/02* (2006.01)
*C08F 220/28* (2006.01)

(52) U.S. Cl.
CPC .............. *C08F 2/48* (2013.01); *C08F 222/1006* (2013.01); *C08F 299/024* (2013.01); *C08F 2220/286* (2013.01); *H01M 10/0565* (2013.01); *H01M 2300/0082* (2013.01)

(58) Field of Classification Search
CPC .............. H01M 2300/0082; H01M 2300/0091
See application file for complete search history.

(56) References Cited

U.S. PATENT DOCUMENTS

| 5,609,974 | A  | * | 3/1997 | Sun ................................ 429/317 |
| 2007/0254976 | A1 | * | 11/2007 | Hirata et al. .................. 522/107 |
| 2009/0104538 | A1 | * | 4/2009 | Wakihara .......... H01M 10/0565 429/317 |
| 2010/0162892 | A1 |   | 7/2010 | Kase et al. |

FOREIGN PATENT DOCUMENTS

| CN | 101754798 | | 6/2010 |
| JP | 2001 155771 | * | 6/2001 |

OTHER PUBLICATIONS

JP 2001 155771 machine translation (2001).*
Anette Munch Elmer, etal. "Solid electrolyte membranes from semi-interpenetrating polymer networks of PEG-grafted polymethacrylates and poly(methyl methacrylate)", Solid State Ionics. vol. 177, pp. 573-579, 2006.

* cited by examiner

*Primary Examiner* — Kuo-Liang Peng
(74) *Attorney, Agent, or Firm* — Novak Druce Connolly Bove + Quigg LLP

(57) ABSTRACT

A method for making a solid electrolyte includes the following steps. A first monomer, a second monomer, an initiator and a lithium salt are provided. Wherein the first monomer is $R_1\text{—O}\text{—}(CH_2\text{—}CH_2\text{—}O)_n\text{—}R_2$, the second monomer is $R_3\text{—O}\text{—}(CH_2\text{—}CH_2\text{—}O)_m\text{—}R_4$, each "$R_1$", "$R_2$" and "$R_3$" includes —C=C— group or —C≡C— group, "$R_4$" is an alkyl group or a hydrogen (H), and "m" and "n" represents an integer number, molecular weights of the first and second monomers are greater than or equal to 100, and less than or equal to 800. The first and second monomers, the initiator and the lithium salt are mixed to form a mixture, and a weight ratio of the first monomer to the second monomer is less than or equal to 50%. The first and second monomers are polymerized to form an interpenetrating polymer network, and the lithium salt is transformed into a solid solution and dispersing in the interpenetrating polymer network.

12 Claims, 13 Drawing Sheets

Providing a first monomer, a second monomer, an initiator and a lithium salt, wherein the first monomer is $R_1-O-(CH_2-CH_2-O)_n-R_2$, the second monomer is $R_3-O-(CH_2-CH_2-O)_m-R_4$, "$R_1$", "$R_2$" or "$R_3$" all includes $-C=C-$ group or $-C\equiv C-$ group, "$R_4$" is an alkyl group or a hydrogen (H), "m" and "n" respectively represents an integer number, molecular weights of the first and second monomers are greater than or equal to 100, and less than or equal to 800

↓

Mixing the first monomer, the second monomer, the initiator and the lithium salt to form a mixture, wherein a weight ratio of the first monomer and the second monomer is less than or equal to 50%

↓

Polymerizing the first monomer with the second monomer to form an IPN, and the lithium salt becoming into a solid solution dispersed in the IPN, thereby forming the SPE

FIG. 1

METHOD FOR MAKING SOLID ELECTROLYTE

RELATED APPLICATIONS

This application claims all benefits accruing under 35 U.S.C. §119 from China Patent Application No. 201110423696.5, filed on Dec. 17, 2011 in the China Intellectual Property Office, the disclosure of which is incorporated herein by reference. This application is related to applications entitled "SOLID ELECTROLYTE AND LITHIUM BASED BATTERY USING THE SAME", filed Oct. 16, 2012 Ser. No. 13/652,807; "SOLID ELECTROLYTE AND LITHIUM BASED BATTERY USING THE SAME", filed Oct. 16, 2012 Ser. No. 13/652,813; and "INTERPENETRATING POLYMER NETWORK AND METHOD FOR MAKING THE SAME", filed Oct. 17, 2012 Ser. No. 13/653,607.

BACKGROUND

1. Technical Field

The present disclosure relates to methods for making solid electrolytes, in particular, to a method for making a solid polymer electrolyte (SPE).

2. Discussion of Related Art

The demand of high power and high energy density lithium based batteries has been with the rapid development of electric vehicles and portable electronic devices, such as mobile phones, digital cameras and notebook computers.

Electrolytes are important components in lithium based batteries. Solid electrolytes, especially solid polymer electrolytes, are non-volatile, non-explosive, flexible, and electrochemically stable. The polymers with $-(CH_2-CH_2-O)_n-$ segments are compatible with general lithium salts and can be used as solid electrolyte matrixes. However, the polymers with $-(CH_2-CH_2-O)_n-$ segments have high crystallization degrees, which make the solid electrolytes using the polymers be have low ion conductivities and bad thermal stabilities.

What is needed, therefore, is to provide a method for making a solid polymer electrolyte including $-(CH_2-CH_2-O)_n-$ segments, which can overcome the above-mentioned shortages.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

FIG. 1 shows a flowchart of a method for making an SPE of one embodiment.

DETAILED DESCRIPTION

Figure 2:
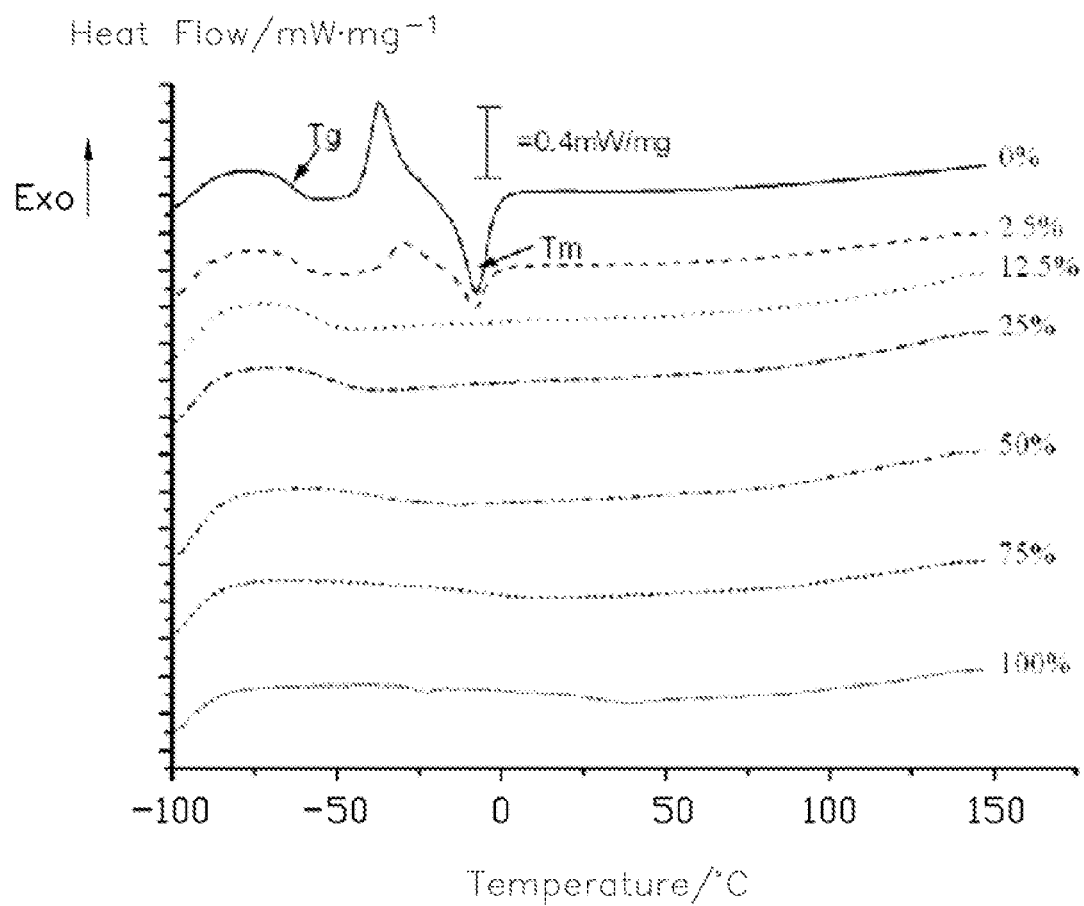
FIG. 2 shows differential scanning calorimetry (DEC) curves of an interpenetrating polymer network (IPN) in an SPE with polyethyleneglycol (200) dimethacrylate (PEG200diA) having different weight percents of methoxy polyethylene glycol (350) monoacrylate (PEG350mA), wherein "200" in PEG200diA represents a molecular weight of PEG group is about 200, and "350" in PEG350mA represents a molecular weight of PEG group is about 350.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Referring to FIG. 1, one method for making an SPE of embodiment is provided. The method includes the following steps:

S10, providing a first monomer, a second monomer, an initiator, and a lithium salt, wherein the first monomer is $R_1-O-(CH_2-CH_2-O)_n-R_2$, the second monomer is $R_3-O-(CH_2-CH_2-O)_n-R_4$, each "$R_1$", "$R_2$" and "$R_3$" includes $-C\equiv C-$ group or $-C=C-$ group, "$R_4$" is an alkyl group or a hydrogen (H), "m" and "n" each represents an integer number, a molecular weight of the first monomer or the second monomer is greater than or equal to 100 and less than or equal to 800;

S20, mixing the first monomer, the second monomer, the initiator and the lithium salt to form a mixture, wherein the first monomer is less than or equal to 50% of the second monomer by weight; and S30, polymerizing the first monomer with the second monomer to form an IPN, and making the lithium salt into a solid solution and dispersing in the IPN, thereby forming the SPE.

In step S10, "$R_1$" and "$R_2$" in the first monomer and "$R_3$" in the second monomer all can be unsaturated chain hydrocarbon groups or unsaturated chain hydrocarbon groups with carbonyl, such as, ethenyl ($-CH=CH_2$), ethynyl ($-C\equiv CH$), allyl ($-CH=CH-CH_3$, or $-(CH_3)C=CH_2$), propinyl ($-C\equiv C-CH_3$), or ethenyl ketonic group

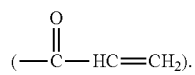

The "$R_1$", "$R_2$" and "$R_3$" in a same IPN can be the same groups or different groups. The "$R_4$" is an alkyl group or an "H" atom. The alkyl group can be methyl (—$CH_3$), ethyl (—$CH_2$—$CH_3$), or propyl (—$CH_2$—$CH_2$—$CH_3$ or —CH—($CH_3$)$_2$). In one embodiment, the molecular weights of the first and second monomers each can be greater than or equal to 200, and less than or equal to 600. In one embodiment, the first monomer is PEG200diA, and the second monomer is PEG350mA.

The initiator is to make the first and second monomers form free radicals and polymerize into the IPN. The initiator can be a thermo-initiator or a photo-initiator. The thermo-initiator can be chloride gas, bromine gas, organic peroxide, or azo initiator. The photo-initiator can be 1-hydroxy-cyclohexyl phenyl ketone (HCPK), 2-methyl-1-[4-(methylthio)-phenyl]-2-morpholino-propiopheno (MMMP), or dimethylol propionic acid (DMPA). The initiator is selected by the pre-polymerizing groups of the first and second monomers. The initiator can vary from the first and second monomers.

The lithium salt is substantially used to conduct ions. The lithium salt can be $LiClO_4$, lithium hexafluoro-phosphate ($LiPF_6$), lithium tetrafluoro-borate ($LiBF_4$), or lithium bis(oxalate)-borate ($Li_2C_2O_4$). The lithium salt also can be an anode active material or a cathode active material, such as lithium manganate ($LiMn_2O_4$), lithium iron phosphate ($LiFePO_4$), lithium nickelate ($LiNiO_2$), or lithium cobalt oxide ($LiCoO_2$).

It can be understood that, a plasticizer can further be provided in step S10. The plasticizer can be a multi-arm star macromolecule material, such as a four-arm star macromolecule material, or a six-arm star macromolecule (SM) material. The multi-arm star macromolecule material can prevent the IPN from being crystallized. The cross linking degree and crystallization of the IPN can be decreased, and the mobility of the branched chains of the IPN can be improved. Therefore, an ionic conductivity of the SPE can be improved. The SPE can still have a high ionic conductivity under room temperature.

In one embodiment, the plasticizer is an SM material synthesized from phloroglucinol, phosphorus oxychloride ($POCl_3$) and methyl polyethylene glycol (MPEG). A chemical reaction equation of forming the SM material is shown as the following chemical reaction equations (1). A molecular weight of the SM can be about 120, 400, 600 or 750. In one embodiment, the molecular weight of the SM is about 400, which can be labeled as SM400.

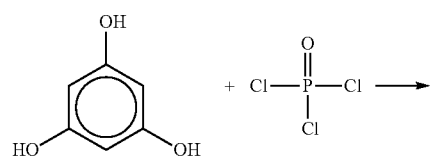

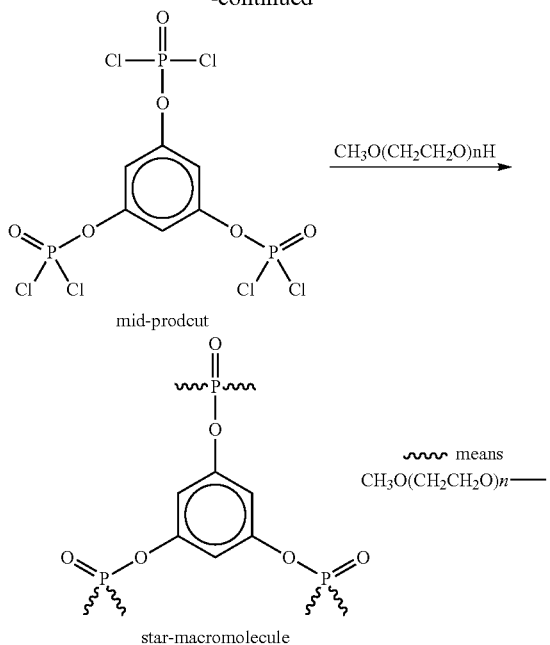

Step S20 can include: firstly, mixing the first and second monomers, thereby forming a first mixture; next, adding the initiator and the lithium salt into the first mixture to form the mixture; and then agitating the mixture. The initiator is less than 1% of the second monomer by weight in the step. Wherein, the lithium salt is less than or equal to 10% of the second monomer by weight. In one embodiment, the first monomer is less than or equal to 20% of the second monomer by weight.

When the plasticizer is provided in the step S10, the step S20 can include the step of mixing the plasticizer with the first monomer, the second monomer, the initiator and the lithium salt, to form a mixture.

If the initiator is the photo-initiator, step S30 can include the sub-steps of: putting the mixture into a protective gas; using a UV light to irradiate the mixture to substantially polymerize the first monomer with the second monomer under the photo-initiator to form the IPN; and drying the IPN and making the lithium salt into the solid solution. The protective gas can be an inert gas, such as nitrogen gas, helium gas, neon gas, argon gas, krypton gas or xenon gas. An irradiating period of UV light is in a range from about 30 minutes to about 2 hours. In one embodiment, the irradiating period ranges from about 45 minutes to about 1.5 hours. The irradiating period can be determined by the weights and types of the first and second monomers. A wave length of the UV light can be about 365 nanometers. In the drying process, the IPN is heated to a first temperature for a first heating period, to remove the solvent used in the process of forming the IPN; the lithium salt is heated into the solid solution and dispersed in the IPN, and the first temperature ranges from about 50 centigrade degrees to about 100 centigrade degrees. In one embodiment, the first temperature is in a range from about 60 centigrade degrees to about 90 centigrade degrees. The first heating period ranges from about 5 hours to about 24 hours. In one embodiment, the first heating period is in a range from about 7 hours to about 12 hours.

When the initiator is the thermo-initiator, the step S30 is mainly made by a thermal polymerization method. The method can include the following sub-steps of: putting the mixture into the protective gas; and heating the mixture to a second temperature for a second heating period, to substantially polymerize the first monomer with the second monomer under the thermo-initiator to form the IPN, and to make the lithium salt into the solid solution. The second temperature in the thermo-polymerizing process can be less than 80 centigrade degrees. In one embodiment, the second temperature is greater than 40 centigrade degrees, and less than 70 centigrade degrees. The second heating period ranges from about 5 hours to about 24 hours. In one embodiment, the second heating period is in a range from about 1 hour to about 12 hours, such as 2 hours, 8 hours. The second temperature and the second heating period can be determined by the amounts and types of the first and second monomers.

In one embodiment, the first monomer is polyethyleneglycol dimethacrylate (PEGdiA), and the second monomer is methoxy polyethylene glycol monoacrylate (PEGmA). That is to say, the IPN is mainly formed by polymerizing PEGdiA and PEGmA. Specifically, a method for making the IPN can include the following steps: providing PEGdiA, PEGmA, and the initiator; mixing PEGdiA, PEGmA, and the initiator to form a mixture, and PEGdiA is less than 50% of PEGmA by weight in the mixture; and then putting the mixture into the protective gas, and irradiating the mixture by UV light or heating the mixture to substantially polymerize PEGdiA with PEGmA under the initiator, thereby forming the IPN.

The SPE made by the above-mentioned method includes the IPN and the lithium salt. The SPE can further include the plasticizer. The lithium salt and the plasticizer can be dispersed in the IPN. The IPN includes $-(CH_2-CH_2-O)_n-$ segments, and is a matrix of the SPE. The IPN can be mainly used to load the lithium salt and the plasticizer. A molecular structure of the IPN can be a linear and open-loop structure. In one embodiment, the molecular structure of the IPN is substantially a branch structure, like a tree.

The method for making the SPE can be further explained with the following examples.

Example 1

An SPE includes an IPN matrix made by a UV—in situ polymerization process. The method for making the SPE includes the following steps:

mixing PEG200diA with PEG350mA according to PEG200diA being less than or equal to 50% of PEG350mA by weight to form a first mixture, and then adding DMPA and $LiClO_4$ into the first mixture to form a mixture, wherein DMPA is about 0.1% of PEG350mA by weight, and $LiClO_4$ is less than or equal to 10% of PEG350mA by weight;

putting the mixture onto a Teflon plate in nitrogen gas; and using a UV light with a wavelength of about 365 nanometers irradiate the mixture for about 60 minutes to substantially polymerize PEG350mA with PEG200diA to form the IPN, thereby obtaining a final mixture including the IPN and $LiClO_4$; and drying the final mixture for about 8 hours at a temperature about 80 centigrade degrees, thereby forming the SPE.

Wherein, PEG200diA and PEG350mA react with each other under DMPA. A chemical reaction equation of PEG200diA and PEG350mA is shown as the following chemical equation (2):

Chemical Reaction

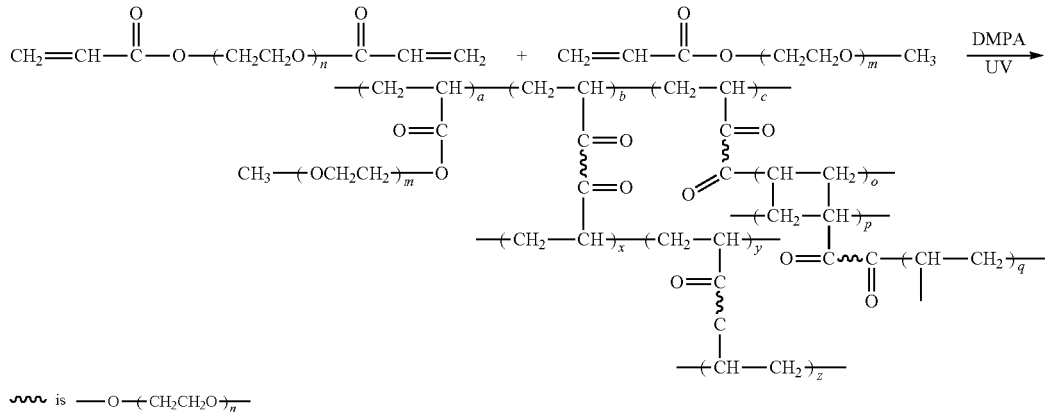

Equation (2)

Wherein all of the subscripts a, b, c, x, y, z, o, p, and q are integers.

In the example 1, the SPE includes the IPN and $LiClO_4$ dispersed in the IPN. The SPE can be labeled as IPN-$LiClO_4$ SPE. Contents of the raw materials for making the IPN-$LiClO_4$ SPE affect properties of the IPN-$LiClO_4$ SPE. Details are shown as follow:

(1.1) Thermal Property of the IPN Matrix

Transferences of $Li^+$ mainly occur in amorphous phase of the IPN matrix. A glass transition temperature ($T_g$) is a characteristic feature of the amorphous phase of the IPN matrix. $T_g$ can be measured by DSC. A crystalline melting temperature ($T_m$) can reflect crystalline structure of the IPN matrix. $T_m$ can also be measured by the DSC. Referring to FIG. 2 and table 1 shown as below, the weight ratio of PEG350mA to PEG200diA is important for the thermal property of the IPN matrix. Wherein, in the table 1, "PEG200diA content by weight" represents that PEG200diA is about a certain percent of PEG350mA by weight.

TABLE 1

| PEG200diA content by weight | $T_g$ (centigrade degrees) | $T_m$ (centigrade degrees) | $\Delta H_m$ (J/K) |
|---|---|---|---|
| 0 | −63.7 | −7.5 | −22.25 |
| 2.5% | −61.1 | −8.0 | −10.69 |

TABLE 1-continued

| PEG200diA content by weight | $T_g$ (centigrade degrees) | $T_m$ (centigrade degrees) | $\Delta H_m$ (J/K) |
|---|---|---|---|
| 12.5% | −57.1 | — | — |
| 25% | −52.8 | — | — |

Wherein $\Delta H_m$ stands for an enthalpy change from PEG350mA and PEG200diA to the IPN, and is related to the ether group.

$T_g$ of the IPN matrix increases with the increase of the PEG200diA content, and the $T_g$ peak is weaker and weaker. When the PEG200diA content is higher than 50%, the $T_g$ peak will disappear. The DSC curves trend towards linear shapes. These may be resulted from the increase of the PEG200diA content. Crosslinking degrees of the IPN matrix are higher and higher as the PEG200diA content increases, which decreases mobility of branched chains in the IPN matrix. The decrease of the mobility of branched chains in the IPN matrix will greatly hinder Li$^+$ migration. Therefore, PEG200diA should be lower than 50% of PEG350mA by weight in the IPN matrix.

In addition, the thermal stability of the IPN matrix is better than single thermal stability of PEG350mA and PEG200diA. The $T_g$ of the IPN matrixes are lower than −45 centigrade degrees. Therefore, the IPN matrix is applicable thermal stability. The IPN matrix is suitable to be used as the matrix of the SPE.

(1.2) FT-IR Spectra of the IPN-LiClO$_4$ SPEs

Figure 3:
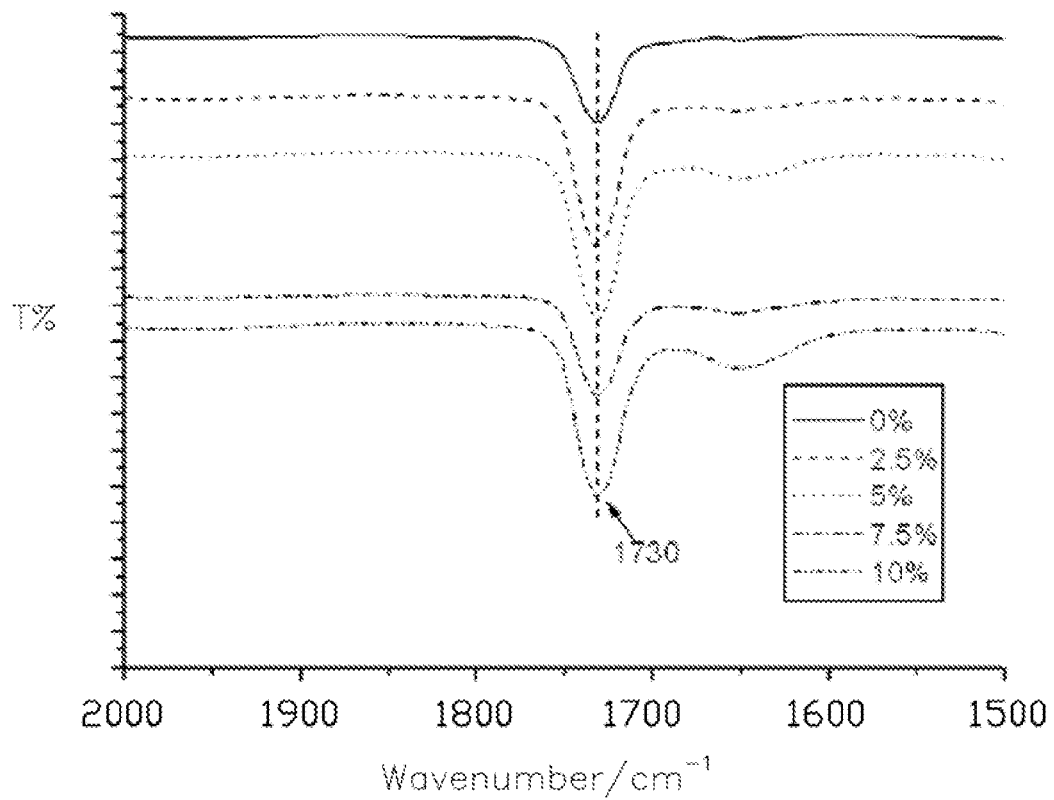
FIG. 3 shows Fourier transform infrared spectroscopy (FTIR) spectra of IPN-lithium perchlorate (IPN-LiClO$_4$) SPEs, wherein lithium perchlorate (LiClO$_4$) has different weight percent of PEG350mA.
Figure 4:
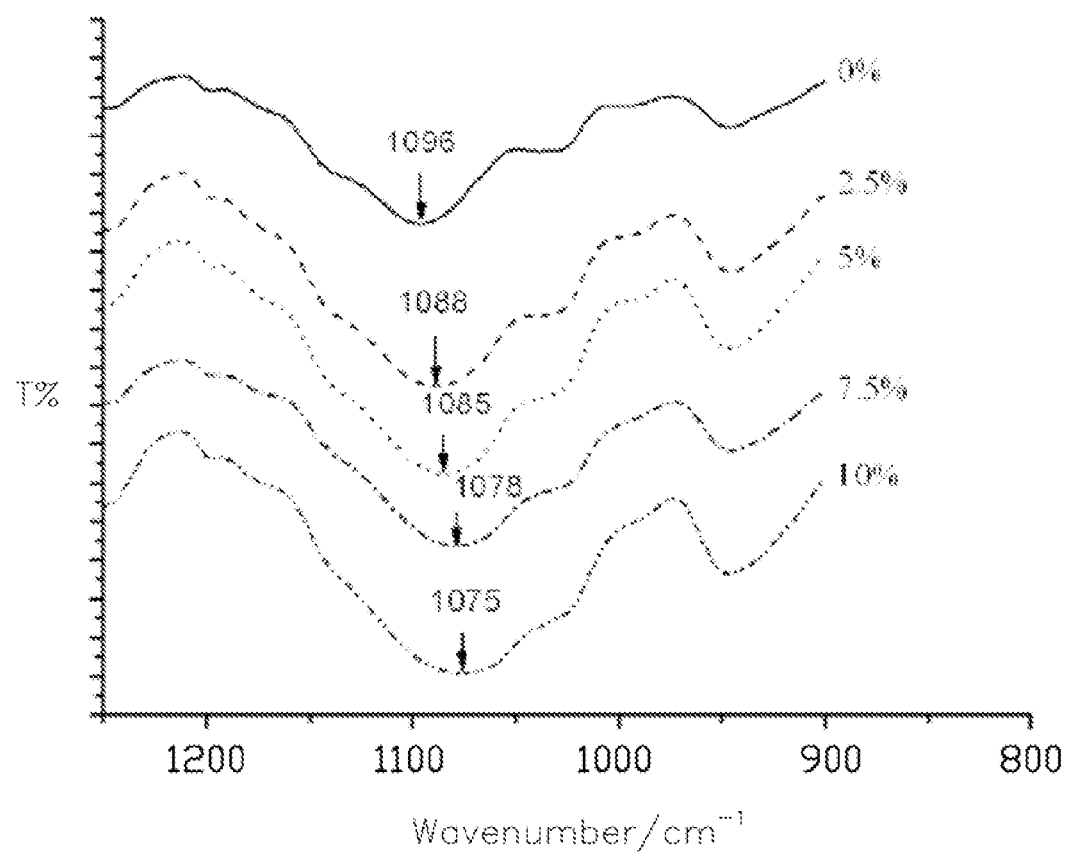
FIG. 4 shows FTIR spectra of stretching vibration of ether groups in IPN-LiClO$_4$ SPEs used in FIG. 3.
Figure 5:
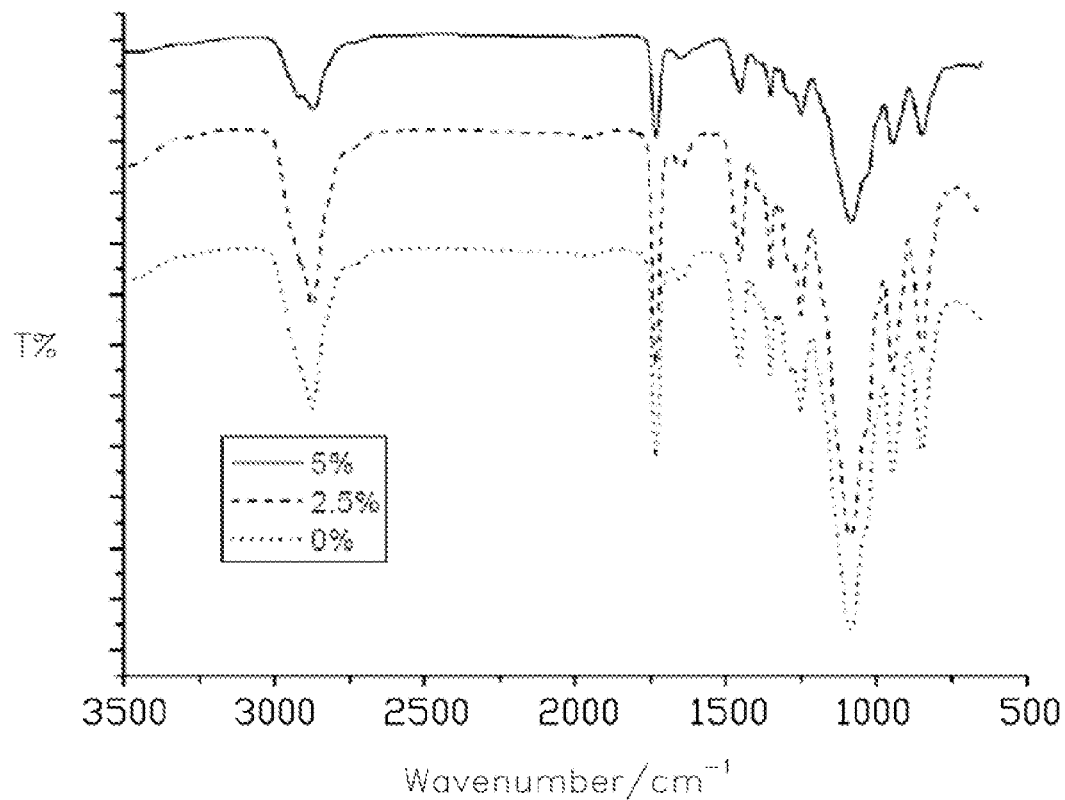
FIG. 5 shows FTIR spectra of IPN-LiClO$_4$ SPEs, wherein PEG200diA has different weight percent of PEG350mA.

Referring to FIGS. 3 and 4, the ether group (C—O—C) is electron donors, and Li$^+$ tends to coordinate with O atoms. When LiClO$_4$ is about 5% by weight of PEG350mA, shapes positions, and relative intensities of the characteristic peaks in the FT-IR of the IPN-LiClO$_4$ shown in FIG. 5 are similar. These show that the weight ratios of the PEG200diA to PEG350mA have tiny effects or even no effects on the shapes, positions, and relative intensities of the characteristic peaks in the FT-IR. It also indicates that Li$^+$ tends to combine with C—O—C in the IPN matrix.

(1.3) Ionic Conductivity of the IPN-LiClO$_4$ SPE

Figure 6:
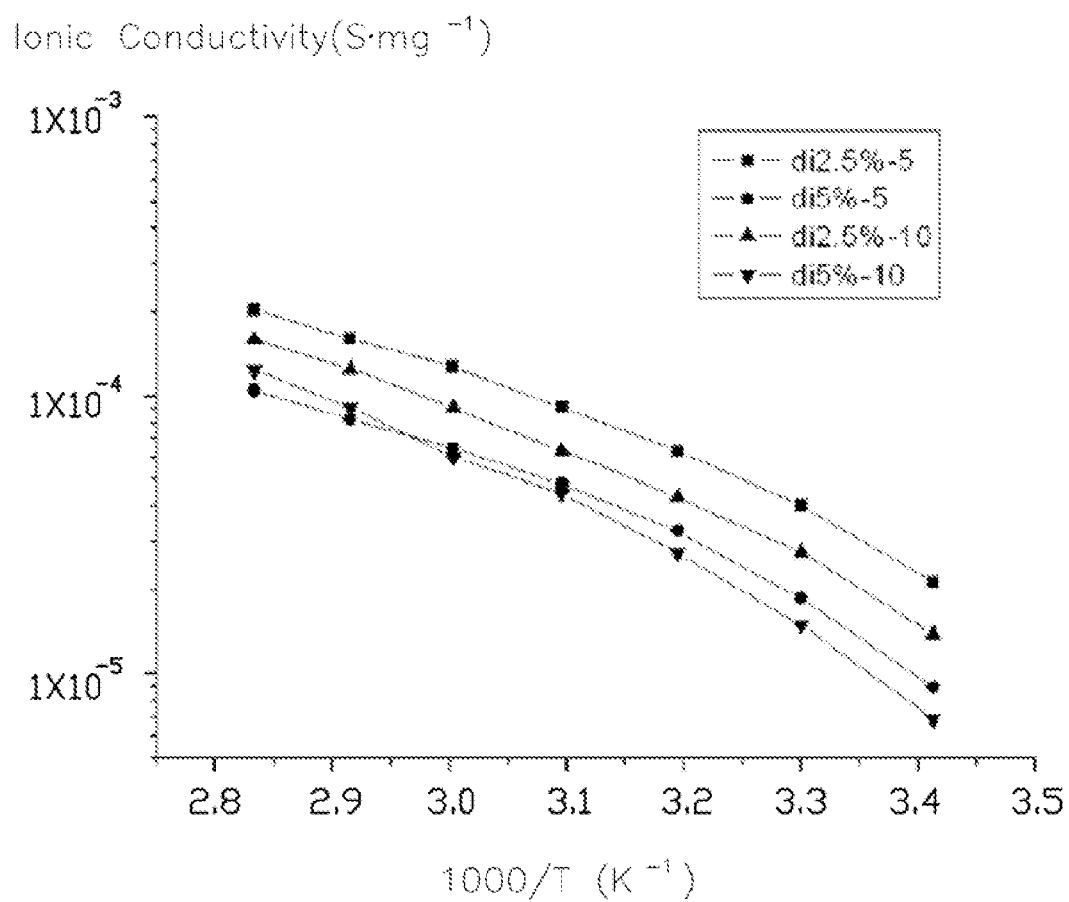
FIG. 6 shows ion conductivity curves of IPN-LiClO$_4$ SPEs, wherein PEG200diA has different weight percent of PEG350mA.
Figure 7:
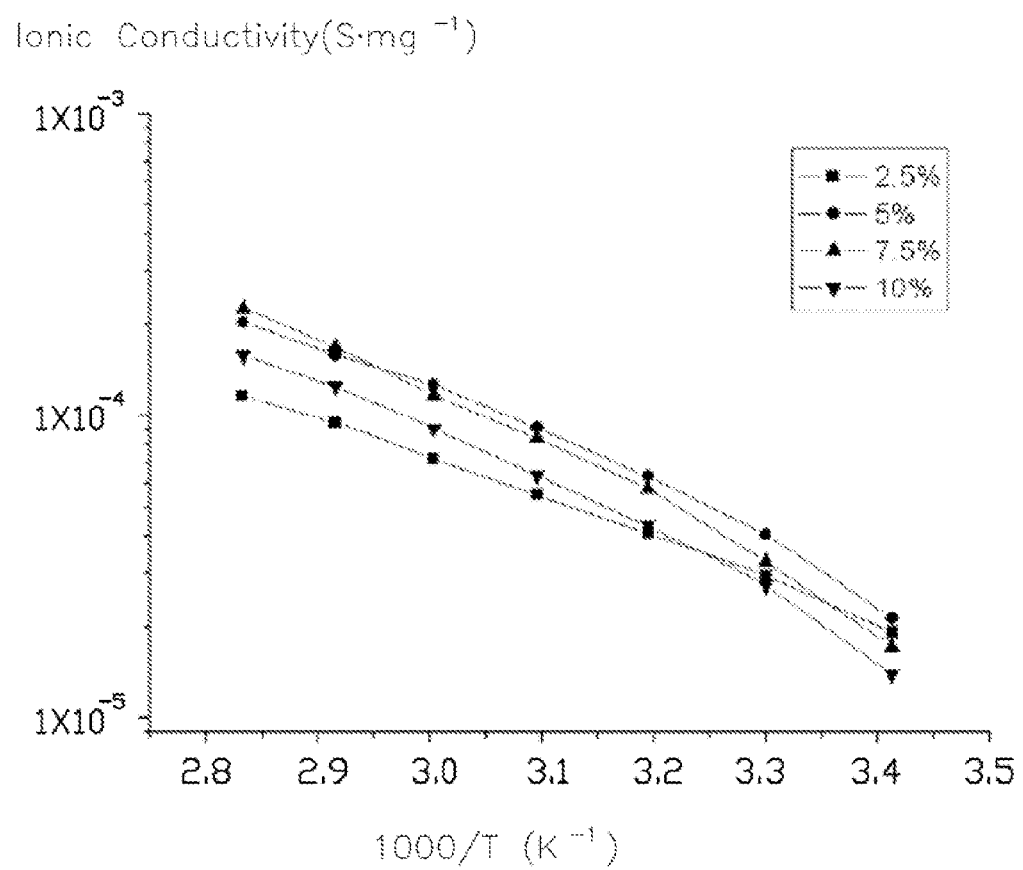
FIG. 7 shows ion conductivity curves of IPN-LiClO$_4$ SPEs, wherein LiClO$_4$ has different weight percent of PEG350mA.

Referring to FIGS. 6 and 7, "T" in the "1000/T" stands for a real Kelvin temperature of the IPNs-LiClO$_4$ SPE, thus "1000/T" is a ratio of 1000 Kelvin (K) to the real Kelvin temperature. In FIG. 6, "di2.5%-5" stands for PEG200diA is about 2.5% of PEG350mA by weight, and LiClO$_4$ is about 5% of PEG350mA by weight; "di5%-5" stands for PEG200diA is about 5% of PEG350mA by weight, and LiClO$_4$ is about 5% of PEG350mA by weight; "di2.5%-10" stands for PEG200diA is about 2.5% of PEG350mA by weight, and LiClO$_4$ is about 10% of PEG350mA by weight; and "di5%-10" stands for PEG200diA is about 5% of PEG350mA by weight, and LiClO$_4$ is about 10% of PEG350mA by weight.

The ionic conductivities of the IPN-LiClO$_4$ SPEs decrease as the increase of "1000/T". Thus, the ionic conductivities of the IPN-LiClO$_4$ SPEs decrease as the decrease of the real temperature of the IPN-LiClO$_4$ SPEs. When LiClO$_4$ content is kept unchanged, PEG200diA content is lower, the ionic conductivities of the IPN-LiClO$_4$ SPEs are higher. The reason can be that PEG200diA can speed the crosslinking of the IPN matrix, improve the cross linking degrees and crystallization degrees of the IPN matrix, and PEG200diA also can decrease the mobility of branched chains of the IPN matrix. Thus the ionic conductivities of the IPN-LiClO$_4$ SPEs are low. Wherein, when PEG200diA is about 5% of PEG350mA by weight, and LiClO$_4$ is about 5% of PEG350mA by weight, the ionic conductivities of the IPN-LiClO$_4$ SPEs are relatively high, such as shown in FIG. 6.

In FIG. 7, when the real temperature is in a range from about 20 centigrade degrees to about 60 centigrade degrees, PEG200diA is about 5% of PEG350mA by weight, the ionic conductivities of the IPN-LiClO$_4$ SPEs are high. When the real temperature is greater than 60 centigrade degrees, PEG200diA is about 2.5% of PEG350mA by weight, LiClO$_4$ is about 7.5% of PEG350mA by weight, and the ionic conductivities of the IPN-LiClO$_4$ SPEs are the highest. The reason may be that LiClO$_4$ dissolves easily in a high temperature. FIG. 7 also shows that the IPN-LiClO$_4$ SPE also can have a high ionic conductivity, even if LiClO$_4$ is in a low content in the IPN-LiClO$_4$ SPE.

(1.4) Thermal Stability of the IPN-LiClO$_4$ SPE

Figure 8:
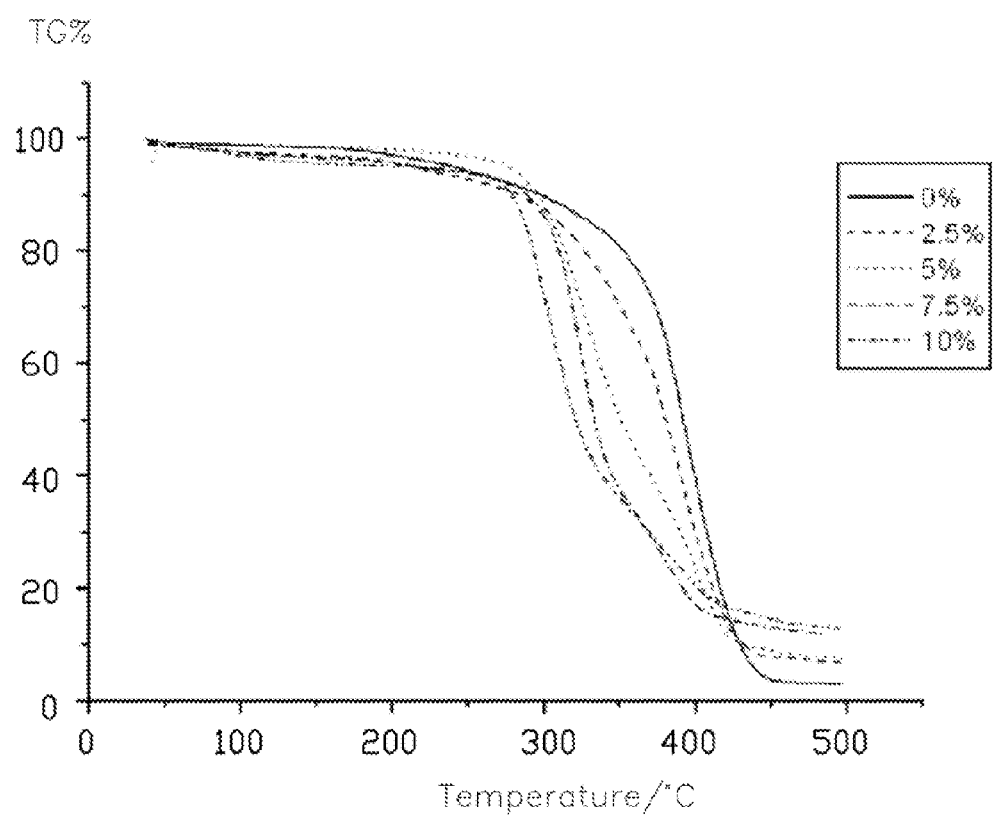
FIG. 8 shows thermo-gravimetric (TG) curves of IPN-LiClO$_4$ SPEs, wherein LiClO$_4$ has different weight percent of PEG350mA.

Referring to FIG. 8, when LiClO$_4$ reaches to about 10% of PEG350mA by weight, the IPN-LiClO$_4$ SPE has excellent thermal stability under about 270 centigrade degrees. Wherein, "TG %" in FIG. 8 stands for a weight of the IPN-LiClO$_4$ SPE at a working temperature is a certain percent of the weight of the IPN-LiClO$_4$ SPE at room temperature.

Example 2

An SPE is made by the following steps:

providing SM400, wherein SM400 can be prepared by dropping phloroglucionl-acetonitrile solution into POCl$_3$ to form a primary mixture; stirring the primary mixture to obtain an intermediate solution; dissolving MPEG-400 into an acetonitrile, thereby forming a secondary mixture; adding the secondary mixture into the intermediate solution; and removing evaporated solution after about 48 hours, thereby obtaining SM400;

mixing PEG350mA, PEG200diA, DMPA, SM400 with LiClO$_4$ to form an intermediate mixture, wherein PEG350mA is about 2.5% of PEG200diA by weight, DMPA is about 0.1% of PEG350mA by weight, and LiClO$_4$ is less than or equal to 10% of PEG350mA by weight; and putting the intermediate mixture onto a Teflon plate in nitrogen gas; and using UV light with a wavelength about 365 nanometers to irradiate the mixture for about 60 minutes to substantially polymerize PEG350mA with PEG200diA to form the IPN, thereby obtaining a final mixture including the IPN, LiClO$_4$ and SM400; and heating the final mixture for about 8 hours at a temperature about 80 centigrade degrees to dry the final mixture, thereby forming the SM-IPN-LiClO$_4$ SPE.

In the example 2, the SPE includes the IPN, LiClO$_4$ and SM400, both LiClO$_4$ and SM400 are dispersed in the IPN. The SPE can be labeled as SM-IPN-LiClO$_4$ SPE. Wherein, contents of the raw materials for making the SM-IPN-LiClO$_4$ SPE affect properties of the SM-IPN-LiClO$_4$ SPE. Details are shown as follow:

(2.1) Compatibility of Ingredients in the SM400-IPN-LiClO$_4$ SPE

Figure 9:
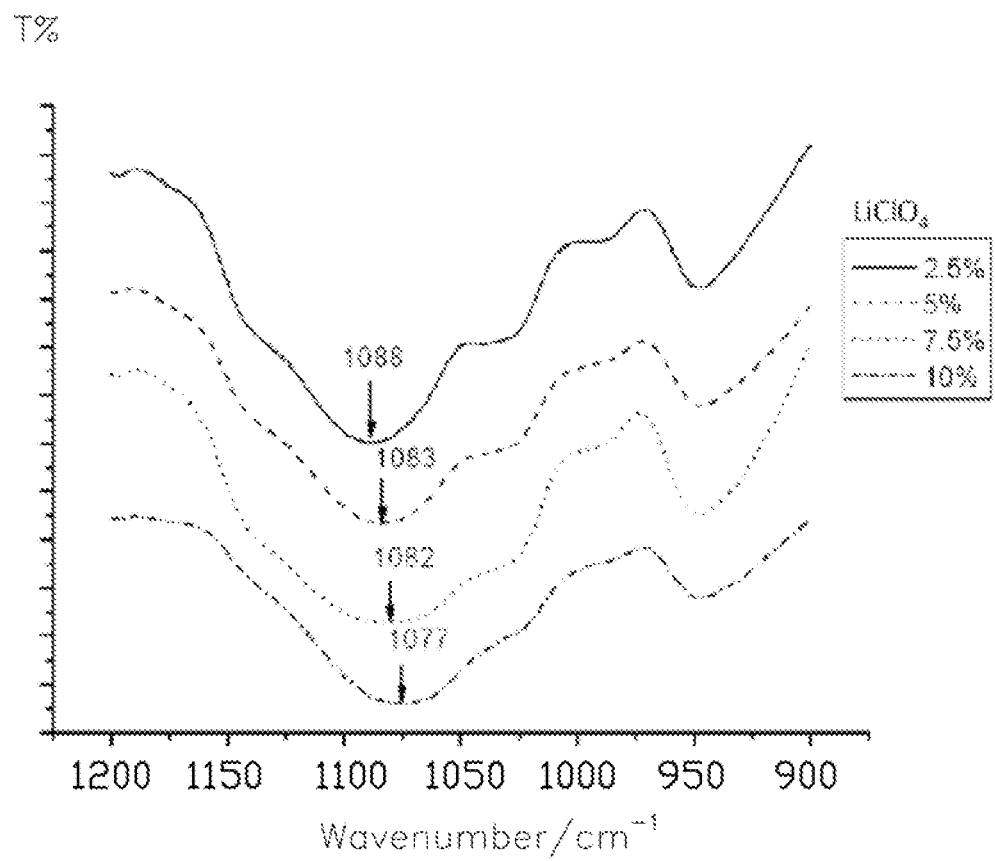
FIG. 9 shows FTIR spectra of six-arm macromolecule (400)-interpenetrating polymer network-lithium perchlorate (SM400-IPN-LiClO$_4$) SPEs, wherein LiClO$_4$ has different weight percents of PEG350mA, "400" in SM400 represents a molecular weight of the six-arm macromolecule (SM) is about 400.

Referring to FIG. 9, there is a characteristic peak at 1088 cm$^{-1}$ caused by the stretching vibration of the functional group C—O—C. As such, the compatibility between LiClO$_4$ and SM400-IPN can be evaluated in view of the stretching vibration of the functional group C—O—C. In FIG. 9, the characteristic peak position shifts from 1088 cm$^{-1}$ to 1077 cm$^{-1}$ with the increase of LiClO$_4$ content, which proves that the functional group C—O—C has a strong effect on Li$^+$. It can be explained as follows. The electronic cloud focuses on the O atom in the functional group C—O—C, the O atom displays negativity. If LiClO$_4$ is dispersed in IPN, Li$^+$ will be bound with the O atom. The density of the electronic cloud focused on the O atom will be decreased. Therefore, the interaction between the O atom in the functional group C—O—C and Li$^+$ will get weak with the increase of LiClO$_4$ content. Blue shift of an infrared characteristic peak position of the functional group C—O—C will occur.

In addition, SM400 has a small effect on the interactions between the functional group C—O—C and Li$^+$. The strong interaction between the functional group C—O—C and Li$^+$ indicates a good compatibility among IPN matrix, SM400 material plasticizer and lithium salt.

(2.2) Thermal Property of the SM400-IPN-LiClO$_4$ SPE

Figure 10:
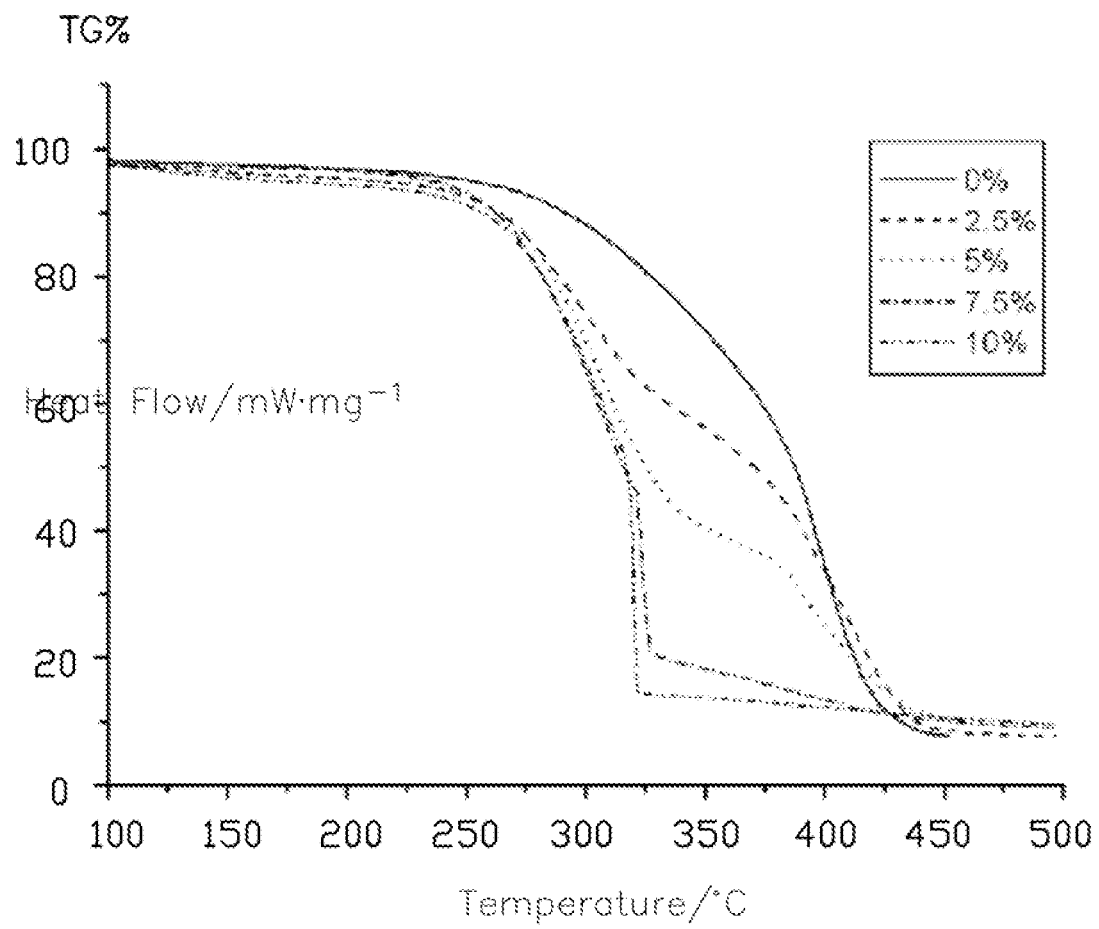
FIG. 10 shows TG curves of the SM400-IPN-LiClO$_4$ SPEs, wherein LiClO$_4$ has different weight percent of PEG350mA.

Referring to FIG. 10, "TG %" stands for a weight of the SM400-IPN-LiClO$_4$ SPE at a working temperature is a certain percent of the original weight of the SM400-IPN-LiClO$_4$ SPE. The SM400-IPN-LiClO$_4$ SPEs display two-stage degradation. The first stage degradation starts at about 250 centigrade degrees and finishes at about 350 centigrade degrees. In the second stage degradation, the degrading speed is increased with the increase of LiClO$_4$ content. SM400 can be decomposed at a temperature ranged from about 220 centigrade degrees to 320 centigrade degrees. The first stage degradation can mainly be attributed to the decomposing of SM400, and the second stage degradation can be caused by the IPN matrix decomposed under the oxidation of LiClO$_4$. Therefore, the completely decomposed temperature of the SM400-IPN-LiClO$_4$ SPE can be decreased as the increase of SM400 content. The SM400-IPN-LiClO$_4$ SPE still can be completely decomposed at a temperature higher than 250 centigrade degrees. Thus, the thermal stability of the SM400-IPN-LiClO$_4$ SPE is good and not easy to decompose at a normal working period. The SM400 includes phosphate groups, which can function as flame retardant. The SM400-IPN-LiClO$_4$ SPE can be safe for applicable in lithium based batteries.

(2.3) Ionic Conductivities of the SM400-IPN-LiClO$_4$ SPEs

Figure 11:
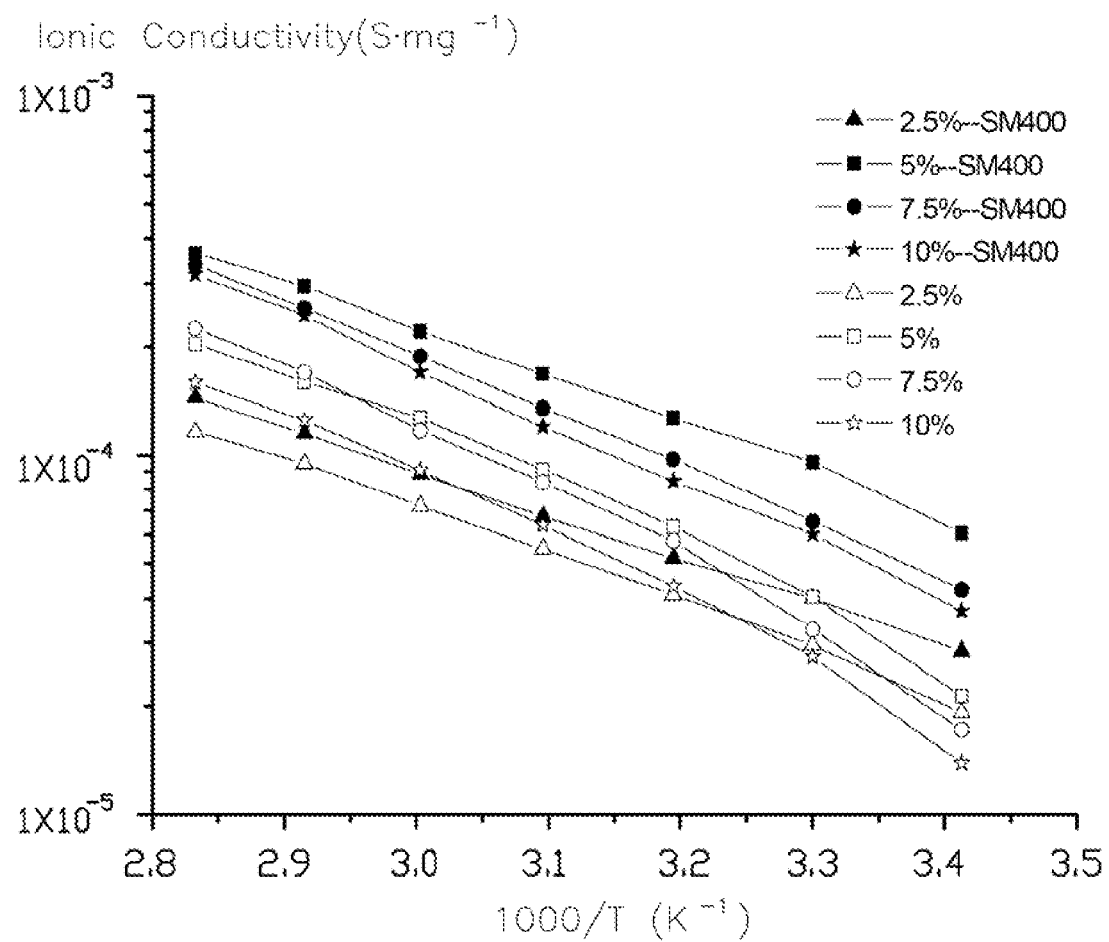
FIG. 11 shows ion conductivity curves of the SM400-IPN-LiClO$_4$ SPEs and IPN-LiClO$_4$, wherein LiClO$_4$ has different weight percent of PEG350mA.

Referring to FIG. 11, marginal data of "2.5%—SM400", "5%—SM400", "7.5%—SM400" and "10%—SM400" all represent that the SPEs include SM400. LiClO$_4$ is respectively about 2.5%, 5%, 7.5% and 10% of PEG350mA by weight. The marginal data without "SM400" represent the SPEs are IPN-LiClO$_4$ SPEs without SM400.

The ionic conductivities of the SM400-IPN-LiClO$_4$ SPEs decrease as the increase of "1000/T". Thus, the ionic conductivities of the SM400-IPN-LiClO$_4$ SPEs decrease as the real temperature of the SM400-IPN-LiClO$_4$ SPEs decreases. When the temperature is kept unchanged, LiClO$_4$ is about 5% of PEG350mA by weight, the ionic conductivities of the IPNs-LiClO$_4$ SPE is the highest. The ionic conductivities of the SM400-IPN-LiClO$_4$ can reach to 6.06×10$^{-5}$ S cm$^{-1}$ at 20 centigrade degrees, and reach to 3.64×10$^{-4}$ S cm$^{-1}$ at 80 centigrade degrees.

Under the same condition, the ionic conductivity of IPN-LiClO$_4$ SPE can be improved by adding SM400. For example, at about 20 centigrade degrees, LiClO$_4$ is about 5% of PEG350mA by weight, the ionic conductivity of IPN-LiClO$_4$ SPE can be improved to 6.06×10$^{-5}$ S cm$^{-1}$ from 2.14×10$^{-5}$ S cm$^{-1}$ by adding SM400. The reasons can be explained as follow. SM400 can prevent the IPN from being crystallized, and can decrease the crystallization degree of the IPN. Thus, SM400 can improve the ionic conductivities of SPEs. The improvement effect of SM400 on the ionic conductivities of SPEs can decrease with the increase of temperature.

(2.4) Li$^+$ Transference Number in a Lithium Metal Battery Using the IPN-LiClO$_4$ SPE The lithium metal battery using the IPN-LiClO$_4$ SPE can be expressed as Li|(SM400-IPN-LiClO$_4$)|Li. In one embodiment, the Li$^+$ transference number in the lithium metal battery can be measured by a method proposed by Bruce et al. Wherein, Li$^+$ transference number can be calculated by the following formula:

$$t^+ = \frac{I_s(V - I_0 R_0)}{I_0(V - I_s R_s)}$$

Wherein, t$^+$ represents the ion transference number; V represents the constant voltage applied to the lithium metal battery; R$_0$ and R$_s$ respectively represents the initial and steady-state resistances of a passivating layer in the lithium metal battery; I$_0$ and I$_s$ respectively represents the initial and steady-state currents of the lithium metal battery.

Figure 12:
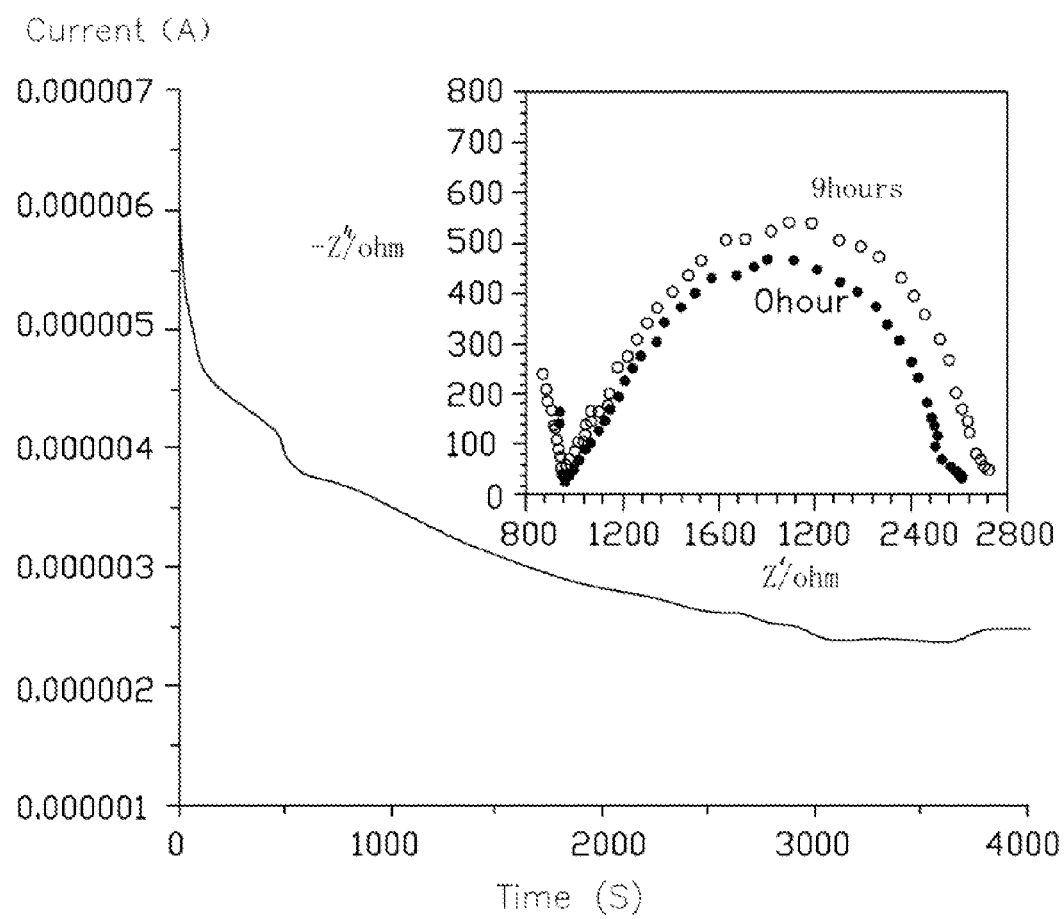
FIG. 12 shows a chronoamperometric curve of a lithium metal battery using the SM400-IPN-LiClO$_4$ SPEs, and alternating current (AC) impedance spectra of the lithium metal battery before and after steady state current.

Referring to FIG. 12, in the SM400-IPN-LiClO$_4$ SPE, LiClO$_4$ is about 5% of PEG350mA by weight. The constant voltage V is about 10 millivolt (mV). The initial current I$_0$ is about 6.254×10$^{-6}$ amperes (A). The current response is completely stabilized after about 9 hours. The steady-state current is about 2.5×10$^{-6}$ A. The Li$^+$ transference number is about 0.400 calculated by the above expression. Li$^+$ transference number can reach to 0.4 attribute to the mobility of the branched chains of IPN. Li$^+$ transference number can reach to 0.4, which also can prove that the SM400-IPN-LiClO$_4$ SPE can be applied in lithium metal battery.

Figure 13:
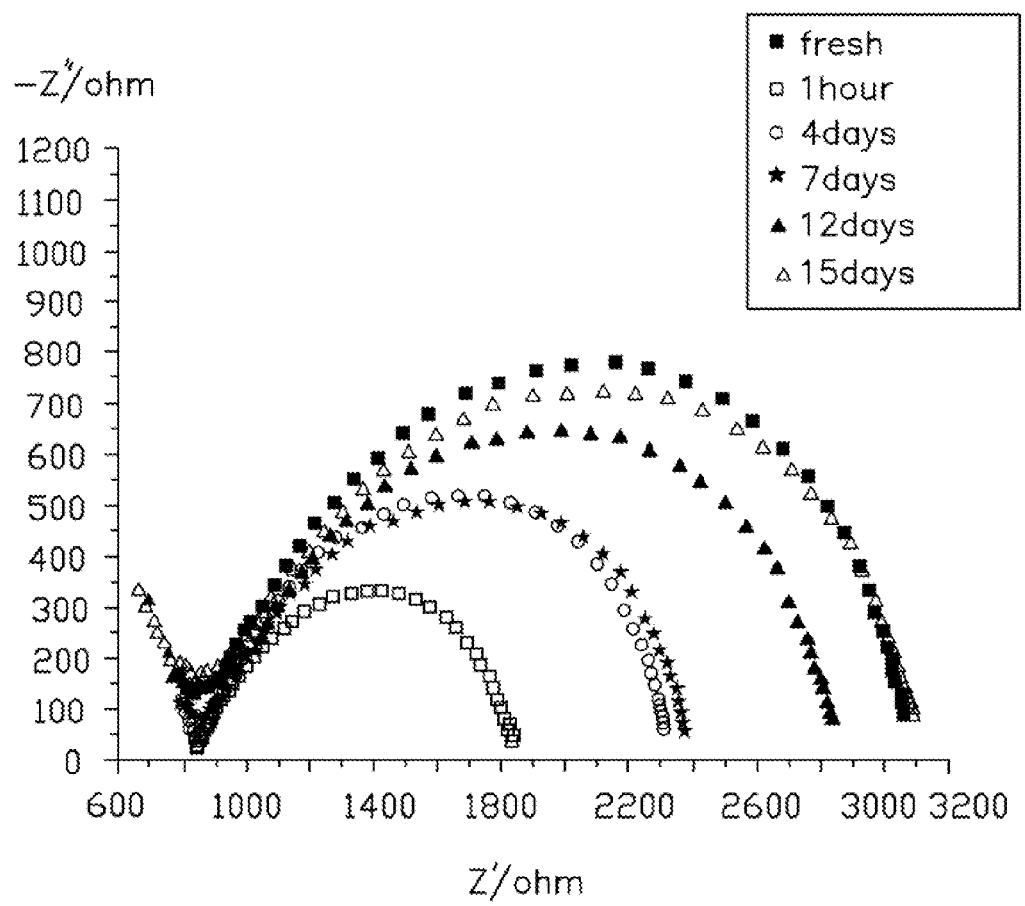
FIG. 13 shows AC impedance spectra of the lithium metal battery used in FIG. 12.

(2.5) Electrochemical Compatibility of SM400-IPN-LiClO$_4$ SPE with Metal Lithium Electrodes in the Lithium Metal Battery Li|(SM400-IPN-LiClO$_4$)|Li The AC impedance spectra of Li|(SM400-IPN-LiClO$_4$)|Li battery as a function of aging time under open-circuit conditions at room temperature are shown in FIG. 13. Except the fresh state, there is a progressive expansion of the semicircle in the middle frequency range, and eventually it is almost stabilized at a constant value of about 2300Ω. The semicircle shows the continuous growth of a resistive layer on a lithium metal surface, and the semicircle finally get changeless indicates that SM400-IPN-LiClO$_4$ is electrochemically stable for lithium metal. Therefore, the SM400-IPN-LiClO$_4$ can be applied in lithium ion batteries, or used in secondary lithium metal batteries.

The methods for making the SPEs are simple, and easy to operate. The SPEs made by the methods have the following advantages:

The IPN matrix has a low crystallization degree such that the ionic conductivity of the SPE is high. The IPN matrix includes ─(─CH$_2$─CH$_2$─O─)$_n$ segments, the O atoms in the ─(─CH$_2$─CH$_2$─O─)$_n$ segments combines with Li$^+$. Therefore, the IPN-LiClO$_4$ SPE also can have a high ionic conductivity, even if LiClO$_4$ is in a low content, or the IPN-LiClO$_4$ SPE is used at room temperature. In addition, branched chains of the IPN matrix have low degrees of crystallization, which causes the IPN matrix to have a high T$_g$. And the IPN matrix is good in thermal stability and electro-chemical stability. Therefore, the IPN-LiClO$_4$ SPE using the IPN matrix also has good thermal stability and electro-chemical stability. Because the IPN-LiClO$_4$ SPE is excellent in high ionic conductivity, thermal stability and electro-chemical stability, the lithium battery using the IPN-LiClO$_4$ SPE has long lifespan, high power, good stability, and is safe to use.

In addition, when the SPEs further include the multi-arm star macromolecule materials, the multi-arm star macromolecule materials can decrease the crosslinking and crystallization degrees of the IPN, and improve the mobility of the branched chains of the IPN. Therefore, the ionic conductivities, thermal stabilities and electrochemical stabilities of the SPEs can be improved. The lifespan, stability and safety of the lithium based battery using the SPEs also can be improved.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A method for making a solid electrolyte, comprising:
providing a first monomer, a second monomer, an initiator, and a lithium salt; wherein the first monomer is $R_1$—O—($CH_2$—$CH_2$—O—)$_n R_2$, the second monomer is $R_3$—O—($CH_2$—$CH_2$—O—)$_m R_4$, each "$R_1$", "$R_2$" and "$R_3$" comprises —C=C— group or —C≡C— group, "$R_4$" is an alkyl group or a hydrogen (H), "m" and "n" respectively represents an integer number, and a molecular weight of the first monomer or a molecular weight of the second monomer is greater than or equal to 100, and less than or equal to 800;
providing a plasticizer;
mixing the plasticizer with the first monomer, the second monomer, the initiator, and the lithium salt to form a mixture; wherein the first monomer is less than or equal to 50% of the second monomer by weight, and the plasticizer is a four-arm macromolecule material or a six-arm macromolecule material; and
polymerizing the first monomer with the second monomer to form an interpenetrating polymer network, and transforming the lithium salt into a solid solution and dispersing in the interpenetrating polymer network, thereby forming the solid electrolyte.

2. The method of claim 1, wherein each "$R_1$", "$R_2$" and "$R_3$" comprises an unsaturated chain hydrocarbon group or an unsaturated chain hydrocarbon group with carbonyl.

3. The method of claim 2, wherein each "$R_1$", "$R_2$" and "$R_3$" comprises ethenyl (—CH=$CH_2$), ethynyl (—C≡CH), allyl (—CH=CH—$CH_3$, or —($CH_3$)C=$CH_2$), propinyl (—C≡C—$CH_3$), or ethenyl ketonic group

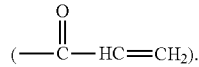

4. The method of claim 1, wherein the molecular weight of the first monomer or the molecular weight of the second monomer is greater than or equal to 200 and less than or equal to 600.

5. The method of claim 1, wherein the lithium salt is selected from the group consisting of lithium perchlorate, lithium hexafluoro-phosphate, lithium tetrafluoro-borate, lithium bis(oxalate)-borate, lithium manganate, lithium iron phosphate, lithium nickelate, lithium cobalt oxide, and combinations thereof.

6. The method of claim 1, wherein the providing the plasticizer comprises:
dropping a phloroglucionl-acetonitrile solution into phosphorus oxychloride to form a primary mixture;
stirring the primary mixture to obtain an intermediate solution;
dissolving methyl polyethylene glycol-400 into an acetonitrile to form a secondary mixture;
adding the secondary mixture into the intermediate solution; and
removing evaporated solution after about 48 hours, thereby obtaining a six-arm macromolecule material.

7. The method of claim 1, wherein the initiator is a photo-initiator selected from the group consisting of 1-hydroxy-cyclohexyl phenyl ketone, 2-methyl-1-[4-(methylthio)-phenyl]-2-morpholino-propiopheno, and dimethylol propionic acid.

8. The method of claim 7, wherein the polymerizing the first monomer with the second monomer to form the interpenetrating polymer network comprises a step of: putting the mixture into a protective gas, and using a UV light to irradiate the mixture for a period to polymerize the first monomer with the second monomer under the photo-initiator.

9. The method of claim 8, wherein the protective gas is nitrogen gas, helium gas, neon gas, argon gas, krypton gas or xenon gas.

10. The method of claim 8, wherein the period is in a range from about 30 minutes to about 2 hours.

11. The method of claim 8, wherein the first monomer is polyethyleneglycol (200) dimethacrylate, the second monomer is methoxy polyethylene glycol (350) monoacrylate, and the photo-initiator is dimethylol propionic acid.

12. The method of claim 11, wherein the mixing the first monomer, the second monomer, the initiator and the lithium salt to form the mixture comprises steps of mixing polyethyleneglycol (200) dimethacrylate with methoxy polyethylene glycol (350) monoacrylate with a predetermined ratio to form a middle mixture, and then adding lithium perchlorate and dimethylol propionic acid into the middle mixture.

* * * * *